(No Model.)
B. TOULOUSE & J. DELORIEUX.
WELDING AND UPSETTING MACHINE.
No. 430,710. Patented June 24, 1890.
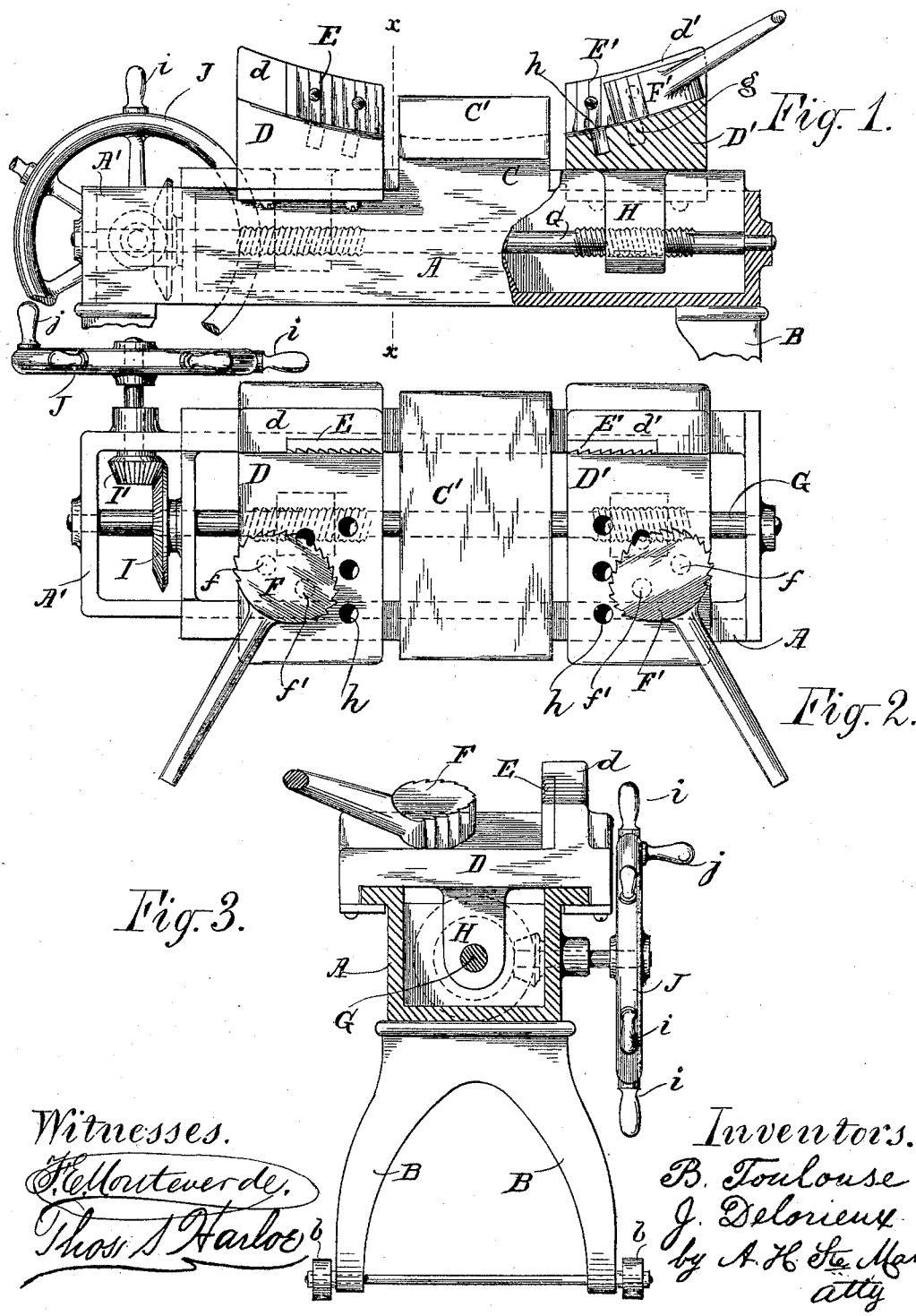
Witnesses.
F. E. Monteverde.
Thos. S. Harloe.
Inventors.
B. Toulouse
J. Delorieux
by A. H. Ste Marie
atty

UNITED STATES PATENT OFFICE.

BERNARD TOULOUSE AND JOHN DELORIEUX, OF SAN FRANCISCO, CALIFORNIA.

WELDING AND UPSETTING MACHINE.

SPECIFICATION forming part of Letters Patent No. 430,710, dated June 24, 1890.

Application filed April 16, 1890. Serial No. 348,240. (No model.)

*To all whom it may concern:*

Be it known that we, BERNARD TOULOUSE and JOHN DELORIEUX, both citizens of the United States, and residents of the city and county of San Francisco, in the State of California, have invented a new and Useful Machine for Welding Metals and Upsetting Tires, &c.; and we do hereby declare the following to be a full and exact description of the invention, such as will enable others skilled in the art to which it appertains to construct and use the same.

Our invention relates more particularly to improvements in upsetters in which are used two carriages, simultaneously movable toward or away from the stationary central anvil; and the objects of our improvement are, first, to render machines of this class as useful for welding as for upsetting; second, to provide for the ready adaptation of the jaws and serrate cams borne by the carriages to the various widths of tires to be upset or of axles or other pieces to be welded, and, third, to furnish such means for moving the carriages as afford the most power and speed, as well as the greatest convenience to the operator. These objects we attain by the mechanism illustrated in the accompanying drawings, in which—

Figure 1 is a broken side elevation of our improved machine; Fig. 2, a plan of the same; and Fig. 3 a cross-section taken from the line $x\ x$, Fig. 1, looking to the left.

The same letters of reference indicate corresponding parts in the several views.

The letter A represents the machine-frame, which is mounted upon legs B. Rollers $b$, attached to the latter, facilitate the removal of the machine from one point to another.

C is an anvil made integral with the central part of the frame A. This anvil has its upper face formed slightly concave, as shown by a dotted line in Fig. 1, to afford a suitable seat for the convex side of tires or other curved articles which have to be shrunk, expanded, or welded, as the case may be. On each side of this anvil we place two carriages D D', which extend across and are adapted to slide along the top of the frame A, they engaging outwardly-projecting flanges at the upper edges of the latter. (See Fig. 3.) The upper face of these carriages is somewhat curved up to form a continuation of the arc described by the upper face of the anvil C, and they each have an upwardly-projecting plate $d\ d'$, cast integral with themselves. The plates $d\ d'$ are cut away at their inner ends, and thus afford recesses for smaller toothed plates or jaws E E'.

Upon the stationary anvil C we place a supplemental or removable anvil C', which is used chiefly in welding or in the upsetting of straight pieces. Its under side fits into the anvil C, but its upper face is made straight and brought in line, or nearly so, with the uppermost outer corners of the carriages D D', in order to present a level support for the straight pieces to be welded or upset.

F F' represent serrated cams, which are adapted, in conjunction with the jaws E E', to grip and hold the tires, axles, or other articles laid upon the carriages D D' and either of the anvils C C.' These cams are elliptical in shape, and revolve upon a detachable pin $g$, Fig. 1, one end of which enters either of two holes or cavities formed in their under side at the foci $f f'$ of the ellipse, and the other—one of a series of corresponding holes or cavities $h$—formed in the front end of the carriages D D'. As will be noticed, F F' are each provided on their periphery with a double set of oppositely-pointed teeth running from the inner end of their shorter axis to near the cam-handles. This arrangement of the teeth, taken in connection with the double eccentricity of the cams, allows of a double use of the latter by transposition, as will be more fully explained farther on.

The carriages are moved by means of a right-and-left screw G, which engages internal screws formed in lugs H, depending from the under side of D D'. This screw is journaled in and confined between the ends of the frame A and a bracket or extension A' projecting outwardly from one of these ends. It is operated through the medium of bevel-gears I I' and a crank-wheel J, placed at the rear side of the piece A'. Besides the wrist $j$ this wheel is also provided with handles $i$, which, being disposed at suitable intervals around its periphery, give a better purchase than the simple crank-pin.

Our improved machine is operated as follows: The carriages D D' are first retracted from or moved toward the central anvils by giving a few turns either way to the screw G until the desired position is secured. The cams F F', with the detachable pins $g$ at their foci $f'$, are next adjusted in place according to the size of the pieces to be held by inserting the lower end of $g$ into holes $h$, suitably distant from the jaws E E'. The axle or other straight pieces to be welded having been heated to welding-heat are then laid across the carriages D D' close to the jaws E E' in such a manner as to meet upon the anvil C', and the cams are applied. This being done the operator gives a few rapid turns to the wheel J and revolves the screw G, so as to move the carriages D D' inwardly, thereby exercising a powerful endwise pressure upon the heated pieces, while his assistant strikes and completes the joint. Articles to be upset are handled precisely in the same way, excepting that they are not, usually, cut in separate pieces, but are heated at their thinnest or weakest part and then shrunk and beaten, as above described. Tires or other curved pieces to be upset or welded undergo a like treatment, with this difference, that the anvil C' is removed and the upsetting or welding effected upon the lower anvil.

Although our improved machine is mainly used for welding and upsetting, it may as well be employed for expanding metals as for contracting them. In that case, as in welding and upsetting, the pieces to be drawn out are heated and laid across D D' and either of the anvils C C', as previously explained; but the cams F F' are transposed and the carriages moved in an opposite direction—that is to say, the screw G is rotated so as to move the carriages away from the central anvils, and the cams are respectively transferred from one carriage to the other and made to revolve upon the focus $f$. Disposed after this manner, the opposite vertices of the ellipses are brought to bear against the heated pieces and the cam-teeth projected outwardly, notwithstanding that the cam-handles are pushed out in the same direction as before. We thus produce a new machine with which both straight and curved pieces may be either welded or upset or expanded. It is conveniently adapted to all kinds of work in this line, from the coarsest to the finest, and it performs its functions thoroughly.

Having described our invention, what we claim as new, and desire to secure by Letters Patent, is—

1. A welding and upsetting machine comprising a frame, a stationary anvil on the center thereof, carriages upon the top ends of said frame simultaneously movable toward or away from said anvil, and a right-and-left screw to move said carriages, substantially as described.

2. A welding and upsetting machine comprising a frame, a stationary concave anvil C on the center thereof, carriages upon the top ends of the same, said carriages being curved up to form a continuation of the arc described by said concave anvil, and a removable anvil C' upon said stationary anvil, having a flat upper face in a line or thereabout with the uppermost outer corners of said carriages, substantially as and for the purposes described.

3. The carriages D D', having holes or cavities $h$ formed at various points in their front ends, substantially as and for the purposes set forth.

4. The elliptical cams F F', having holes or cavities formed in their under sides at both their foci $f f'$, substantially as and for the purpose set forth.

5. The cams F F', having around their periphery a double set of oppositely-pointed teeth running from near their handles to the inner end of their conjugate axis, substantially as shown, for the purposes specified.

6. A welding and upsetting machine comprising carriages provided with a series of holes or cavities in their upper face, jaws at the rear thereof, detachable pins engaging either of said holes or cavities on both said carriages, and cams adapted to revolve upon said pins and act in connection with said jaws, substantially as described.

7. A welding and upsetting machine comprising carriages provided with a series of holes or cavities formed in their upper face, jaws at the rear thereof, and cams fitted to engage either of said holes and act in connection with said jaws, substantially as set forth.

8. A welding and upsetting machine comprising carriages provided with holes or cavities in their upper face, jaws upon the rear thereof, detachable pins engaging said holes or cavities, and cams adapted to turn upon said pins and act in connection with said jaws, substantially as set forth.

9. A welding and upsetting machine comprising one or more anvils C C', carriages on each side thereof, jaws upon the rear of said carriages, cams upon the front of the same, said cams having outwardly-projecting teeth adapted, in connection with said jaws, to grip and hold metal pieces laid upon and across said carriages and anvil or anvils, and means to move said carriages away from said anvil or anvils, and thereby draw out such metal pieces, substantially as described.

10. A welding and upsetting machine comprising an anvil or anvils, carriages on each side thereof, a right-and-left screw to move said carriages, bevel-gears connected with said screw, and a crank-wheel to operate said screw through said gears, substantially as described.

In witness whereof we have hereunto affixed our hands and seals.

BERNARD TOULOUSE. [L. S.]
JOHN DELORIEUX. [L. S.]

In presence of—
GEO. A. STANLEY,
CHAS. T. STANLEY.